United States Patent [19]

Knight

[11] 4,402,012
[45] Aug. 30, 1983

[54] TWO-DIMENSIONAL DIGITAL LINEAR INTERPOLATION SYSTEM

[75] Inventor: Wesley W. Knight, Liverpool, N.Y.

[73] Assignee: General Electric Company, Syracuse, N.Y.

[21] Appl. No.: 321,890

[22] Filed: Nov. 16, 1981

[51] Int. Cl.³ .......................... H04N 5/14; H04N 7/12
[52] U.S. Cl. .................................. 358/160; 358/180; 358/138; 364/723
[58] Field of Search .................... 358/11, 22, 138, 140, 358/160, 180, 260, 166; 365/515, 723, 853

[56] References Cited

U.S. PATENT DOCUMENTS 4,193,092  3/1980  Stoffel ............................... 358/260
4,286,291  8/1981  Taylor et al. ..................... 358/138
4,302,776 11/1981  Taylor et al. ..................... 358/138
4,303,947 12/1981  Stoffel ............................... 358/138

Primary Examiner—John C. Martin
Attorney, Agent, or Firm—Richard V. Lang; Carl W. Baker

[57] ABSTRACT

A two-dimensional interpolation of image data is provided for a video display system, in which a one-dimensional interpolator performs the interpolation in both dimensions with data flow control so that images can be transmitted, scaled and displayed in real time.

11 Claims, 11 Drawing Figures

|  | α → |  |
|---|---|---|
| β ↓ | P(0,0) = 0 | P(1,0) = 1 |
|  | P(0,1) = 1 | P(1,1) = 0 |

| | α → | | | | |
|---|---|---|---|---|---|
| | 0.0 | 0.25 | 0.50 | 0.75 | 1.0 |
| 0.0 | 0.0 | 0.25 | 0.50 | 0.75 | 1.0 |
| 0.25 | 0.25 | 0.375 | 0.50 | 0.625 | 0.75 |
| β ↓ 0.50 | 0.50 | 0.50 | 0.50 | 0.50 | 0.50 |
| 0.75 | 0.75 | 0.625 | 0.50 | 0.375 | 0.25 |
| 1.0 | 1.0 | 0.75 | 0.50 | 0.25 | 0.0 |

FIG. 9A

| LINE 0 | 0 | 1 | 2 | 3 | • • • • • • • • • • • • • • • • • | 255 |
| LINE 1 | 0 | 1 | 2 | 3 | • • • • • • • • • • • • • • • • • | 255 |
| LINE 2 | 0 | 1 | 2 | 3 | • • • • • • • • • • • • • • • • • | 255 |
| LINE 3 | 0 | 1 | 2 | 3 | • • • • • • • • • • • • • • • • • | 255 |

FIG. 9B

| | | | | | | | | | | | |
|---|---|---|---|---|---|---|---|---|---|---|---|
| BLANK | b | b | b | b | b | b | b | b | • • • • • • | b | b |
| BLANK | b | b | b | b | b | b | b | b | • • • • • • | b | b |
| BLANK | b | b | b | b | b | b | b | b | • • • • • • | b | b |
| LINE 0 | b | b | b | 0 | 0.1 | 0.2 | 0.3 | 1 | • • • • • • | 62.3 | 63 |
| LINE 0.1 | b | b | b | 0 | 0.1 | 0.2 | 0.3 | 1 | • • • • • • | 62.3 | 63 |
| LINE 0.2 | b | b | b | 0 | 0.1 | 0.2 | 0.3 | 1 | • • • • • • | 62.3 | 63 |
| LINE 0.3 | b | b | b | 0 | 0.1 | 0.2 | 0.3 | 1 | • • • • • • | 62.3 | 63 |
| LINE 1 | b | b | b | 0 | 0.1 | 0.2 | 0.3 | 1 | • • • • • • | 62.3 | 63 |
| • | | | | | | | | | | | |
| • | | | | | | | | | | | |
| • | | | | | | | | | | | |
| LINE 62.3 | b | b | b | 0 | 0.1 | 0.2 | 0.3 | 1 | • • • • • • | 62.3 | 63 |
| LINE 63 | b | b | b | 0 | 0.1 | 0.2 | 0.3 | 1 | • • • • • • | 62.3 | 63 |

TWO-DIMENSIONAL DIGITAL LINEAR INTERPOLATION SYSTEM

BACKGROUND OF THE INVENTION

The present invention relates to an interpolation system for video display devices, and, more particularly, to an interpolation system capable of using a one-dimensional interpolator to perform both the X and Y interpolation.

Video display systems have been developed which employ digital technology for transmission and storage of display data. A display can be stored digitally and retrieved to generate a video image by redintegration of the image pixel to pixel. The need for two-dimensional interpolation arises when providing a zoom capability for the display of digitized images required either to reconstruct an image only part of which was actually stored, or to produce an enlarged view of a smaller image. A typical method for providing this capability is to add interpolated pixels (picture cells) between the original data pixels. The number of added pixels determines the amount of zoom provided. An example of a four to one zoom is illustrated in Table 1.

TABLE 1

| Pixel  | 0   | 1   | Pixel    | 0 | 0.1 | 0.2 | 0.3 | 1 |
|--------|-----|-----|----------|---|-----|-----|-----|---|
| Line 0 | •   | •   | Line 0   | • | X   | X   | X   | • |
| Line 1 | •   | •   | Line 0.1 | X | X   | X   | X   | X |
|        | (a) |     | Line 0.2 | X | X   | X   | X   | X |
|        |     |     | Line 0.3 | X | X   | X   | X   | X |
|        |     |     | Line 1   | • | X   | X   | X   | • |

In the original data lines 0 and 1 are stored as a series of pixels at points 0, 1, etc., as shown in part (a) of Table 1. After two-dimensional interpolation lines 0 and 1 are separated by lines whose position is designated 0.1, 0.2 and 0.3 and the original pixels in each line are separated by pixels whose position is designated 0.1, 0.2 and 0.3, as shown in part (b) of Table 1. This pattern is repeated for the full extent of the video image, thereby linearly expanding the image in two dimensions. For black and white displays, an intensity data for each pixel is stored. The intensity determines the shade ranging from white to black that will be displayed by the video display. The interpolation between pixels provides a value of intensity for the interpolated pixels.

A typical method for determining the intensity values of the interpolated pixels based upon the intensity values of the original image pixels is called a bilinear interpolation. The formula for obtaining the interpolated pixels is as follows:

$$I_{(\alpha,\beta)} = (1-\beta)[(1-\alpha)I_{(0,0)} + \alpha I_{(1,0)}] + \beta[(1-\alpha)I_{(0,1)} + \alpha I_{(1,1)}]$$

where I is the intensity of a pixel designated by its subscript, and $\alpha$ and $\beta$ represent the x (horizontal and y (vertical) coordinates, respectively, of the image array expressed as fractional distances between the stored pixel values ($0 < \alpha < 1$ and $0 < \beta < 1$). The terms enclosed in the first set of square brackets represent a linear interpolation in the direction of the two pixels in the top line of the four pixel image represented in FIG. 1A. The terms of the second set of square brackets represent a linear interpolation in the x direction of the two pixels in the bottom line. The x direction interpolation creates new pixels between the original pixels as a single line. The weighted combination of the quantities in the two square brackets represents an interpolation of the y dimension which creates a new interpolation in the x dimension, thus resulting in the four to one bilinear interpolated image having the relative weights of the intensities along the $\alpha$ and $\beta$ dimensions shown in FIG. 1B. The value of $\alpha$ in the x dimension varies in uniform increments from 0 through 1, in that a linear interpolation is produced by the formula above. Similarly, $\beta$ varies uniformly in the y dimension to produce the linear interpolation in the vertical direction.

The bilinear interpolator function has typically been accomplished by employing a computer with an image stored in its memory to compute an enlarged image which must also be stored in the computer memory. This method of interpolation is slow and results in delays of several seconds between the initiation of a zoom request and display of the image. A requirement of many display systems is the need to rapidly switch between many enlarged images, and for these applications a large lead time is required to permit the computation of the many enlarged images required. In this technique, each image is fed into a computer which generates the interpolations necessary to enlarge the image, and then stores the enlarged image into computer memory. Each separate image requires a separate memory capable of storing data for each pixel of the image, typically 64,000 cells, and the circuitry necessary to quickly switch between a plurality of stored image memories in order to produce a simulated real time image.

An alternative approach to realizing a real time interpolator would be to use three linear interpolators. One interpolator would provide interpolation in the x direction for a designated line. A second interpolator would compute interpolated pixels in the x direction for a succeeding line to provide sets of pixel data for a y direction interpolation performed by the third interpolator. This approach would require many more parts for the additional interpolators and, since two image lines must be read simultaneously from the image memory in order to perform the y direction interpolation, a more complicated memory control circuit with additional parts would be required.

SUMMARY OF THE INVENTION

An object of the present invention is to provide a real time image interpolation system capable of operating at high speed.

A more particular object of the present invention is to provide a digital linear interpolation system which employs a single one-dimensional interpolator to perform both x and y interpolation for real time video display.

Accordingly, the present invention includes a video data input providing video data image data to an input register and a data multiplexer. A horizontal interpolation is performed for a first line and the output image data stored in a line buffer. A horizontal interpolation is performed for the next successive line and the output image data stored in another line buffer. The interpolator then performs the vertical interpolation which is outputted to the display without storage. Output of the interpolated data is controlled so that the interpolated data for a line stored in one line buffer is provided to an output multiplexer. During this same time period, interpolation of the next line and storage in a second line buffer is carried out. Following output from the first line buffer, interpolated data lines are computed and output in real time. Output from the second line buffer then takes place while a third line is interpolated and stored in the first line buffer, followed by computation and output of interpolated data lines. This sequence is repeated throughout the remainder of that image. The present system can be combined with a variety of image mapping schemes to enhance the image displayed to the user.

BRIEF DESCRIPTION OF THE DRAWINGS

Features of the present invention believed to be novel and unobvious over the prior art are set forth with particularity in the appended claims. The invention itself, however, as to organization, method of operation and the best mode contemplated, together with further objects and advantages may best be understood by reference to the following description taken in conjunction with the accompanying drawings, in which like reference characters refer to like elements throughout, and in which:

FIG. 1 is a diagram showing the expansion of a first pixel accomplished by interpolation;

FIG. 9 is a diagram showing the data pattern for directly stored and displayed data and the display data pattern produced by the interpolator of the present invention.

DESCRIPTION OF THE PREFERRED EMBODIMENTS

The four interpolator states shown in Table 2 provide all the combinations of a system having two inputs, a and b, needed for a four to one interpolation.

TABLE 2

| INTERPOLATOR STATES | 1 | 2 | 3 | 4 |
|---|---|---|---|---|
| MUX 1 OUT | $\frac{1}{2}$ b | $\frac{1}{2}$ a | $\frac{1}{2}$ a | $\frac{1}{2}$ b |
| MUX 2 OUT | $\frac{1}{4}$ b | $\frac{1}{4}$ a | $\frac{1}{4}$ b | $\frac{1}{4}$ a |
| $\frac{1}{4}$ b | $\frac{1}{4}$ b | $\frac{1}{4}$ b | $\frac{1}{4}$ b | $\frac{1}{4}$ b |
| $\Sigma =$ | b | $\frac{3}{4}$a & $\frac{1}{4}$b | $\frac{1}{2}$a & $\frac{1}{2}$b | $\frac{1}{4}$a & $\frac{3}{4}$b |

The four states correspond to the four different combinations of data required to be outputted from the interpolator; namely: b, $\frac{3}{4}$a+$\frac{1}{4}$b, $\frac{1}{2}$a+$\frac{1}{2}$b, $\frac{1}{4}$a +$\frac{3}{4}$b, to produce a linear interpolation of an image. These four sums, one for each state, are the only computations needed for a four-to-one interpolation where a and b represent the image data for stored image pixels. A two-to-one interpolation would require only the first ($\Sigma$=b) and third ($\Sigma$=$\frac{1}{2}$a and $\frac{1}{2}$b) states. Other interpolation expansions can be performed by providing the necessary number of interpolator states. Data can be fed through the interpolator with no change if only state one is used to produce a display image corresponding directly to the stored image.

Figures 1A, 1B, 2:
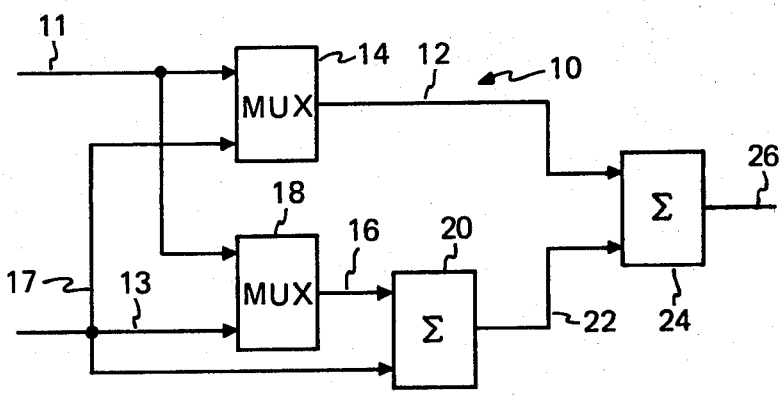
FIG. 2 is a schematic representation of a one-dimensional interpolator circuit employed in the present invention.
Figure 3:
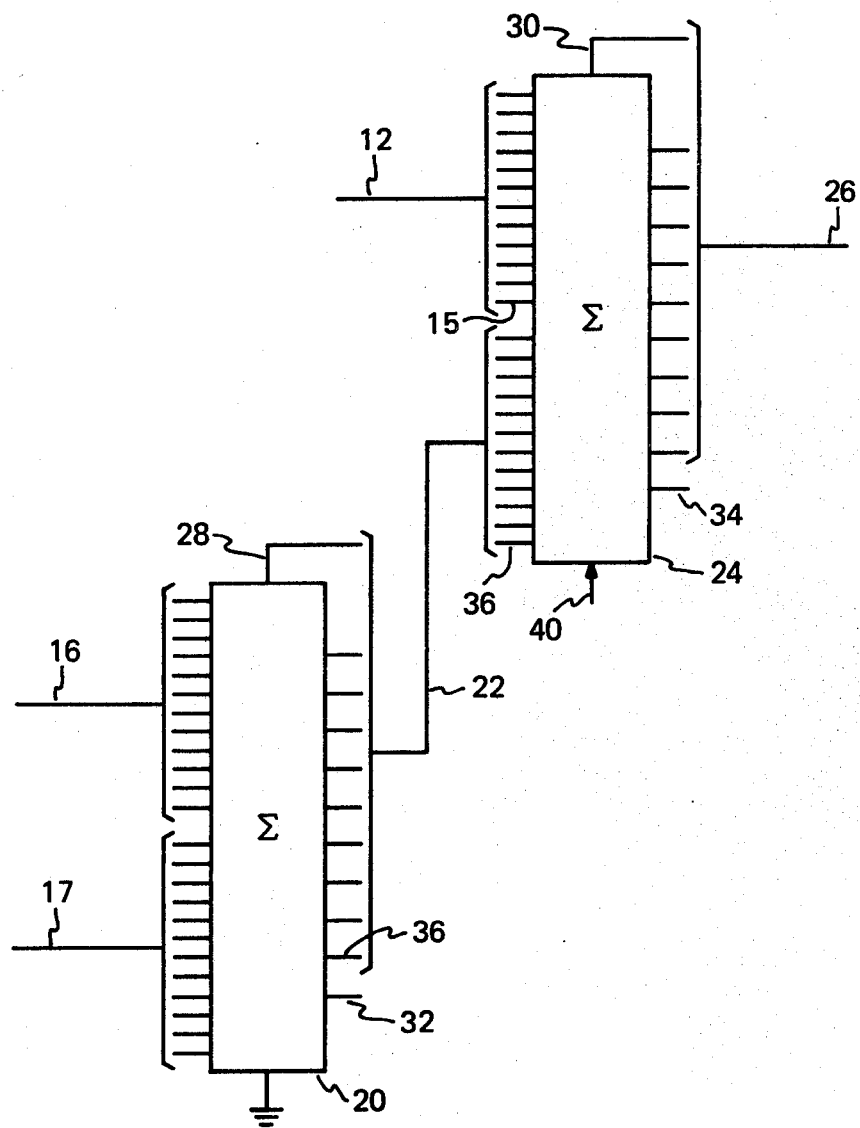
FIG. 3 is a schematic representation of a summer used in the present invention.

A block diagram of a one-dimensional four-to-one interpolator 10 of the present invention is shown in FIG. 2. The one-dimensional interpolator 10 computes the sum of the two multiplexer outputs 12 and 16 plus the b input 17 for each state shown in Table 2. Input line 11 provides the "a" input data to multiplexers 14 and 18 and input line 13 provides the "b" input data to multiplexers 14, 18 and summer 20. Multiplexer 14 provides an output 12 of a or b to to summer 24. Multiplexer 18 provides an output 16 of a or b to summer 20. Summer 20 provides an output 22 scaled to $\frac{1}{4}$a+$\frac{1}{4}$b or $\frac{1}{2}$b. The output 26 of summer 24 is scaled to be b; $\frac{3}{4}$a+$\frac{1}{4}$b; $\frac{1}{2}$a+$\frac{1}{2}$b; or $\frac{1}{4}$a+$\frac{3}{4}$b. These quantities are obtained by shifting a or b, respectively, by one bit in summer 20 and one bit in summer 24. No actual shifting occurs at the multiplexer output 12 but instead the data is considered scaled to $\frac{1}{2}$ (a or b) which is accounted for by a hard-wired upshift of one bit in summer 24. The output 16 of the lower multiplexer 18 is scaled by $\frac{1}{4}$ or a shift of two bits. One bit of the scaling is accounted for by a hard-wired upshift of one bit at the first summer output 20. The output 22 of this summer 20 then goes to the second summer 24 which accounts for the second bit of shift. The scaling is accounted for by hardwired upshifting of the summer outputs 22, 26 by one bit each, as shown at 28 and 30 in FIG. 3. The lsb (least significant bit) 32 of the summer output 22 is ignored. The next least significant bit 36 of the summer output 22 is made the lsb of the input to summer 24. The lsb 34 of the output of summer 24 is ignored. This results in another bit of scaling of the output. Therefore, the inputs 16 and 17 result in an output from summer 24 scaled by $\frac{1}{4}$ to be $\frac{1}{4}$a+$\frac{1}{4}$b or $\frac{1}{2}$b. Since the input 12 to summer 24 is scaled once, the lsb 15 of input 12 is ignored, and the output 26 includes $\frac{1}{2}$a or $\frac{1}{2}$b.

Ignoring the two bits 32, 34 in the summers 20, 24, respectively, constitutes a truncation of the two bits with a $\frac{1}{2}$ weighting at the inputs 16 and 17, and ignoring bit 34 constitutes a trunction of one bit with a $\frac{1}{2}$ weighting of the input 12. The effects of this truncation are reduced by performing a rounding operation in the summer 24. This is implemented by inputting a logical 1 at input 40 of the last summer 24. This method of successive truncation and rounding makes possible the implementation of the summers with only three 4-bit adder circuits instead of four, thus minimizing parts.

Figure 4:
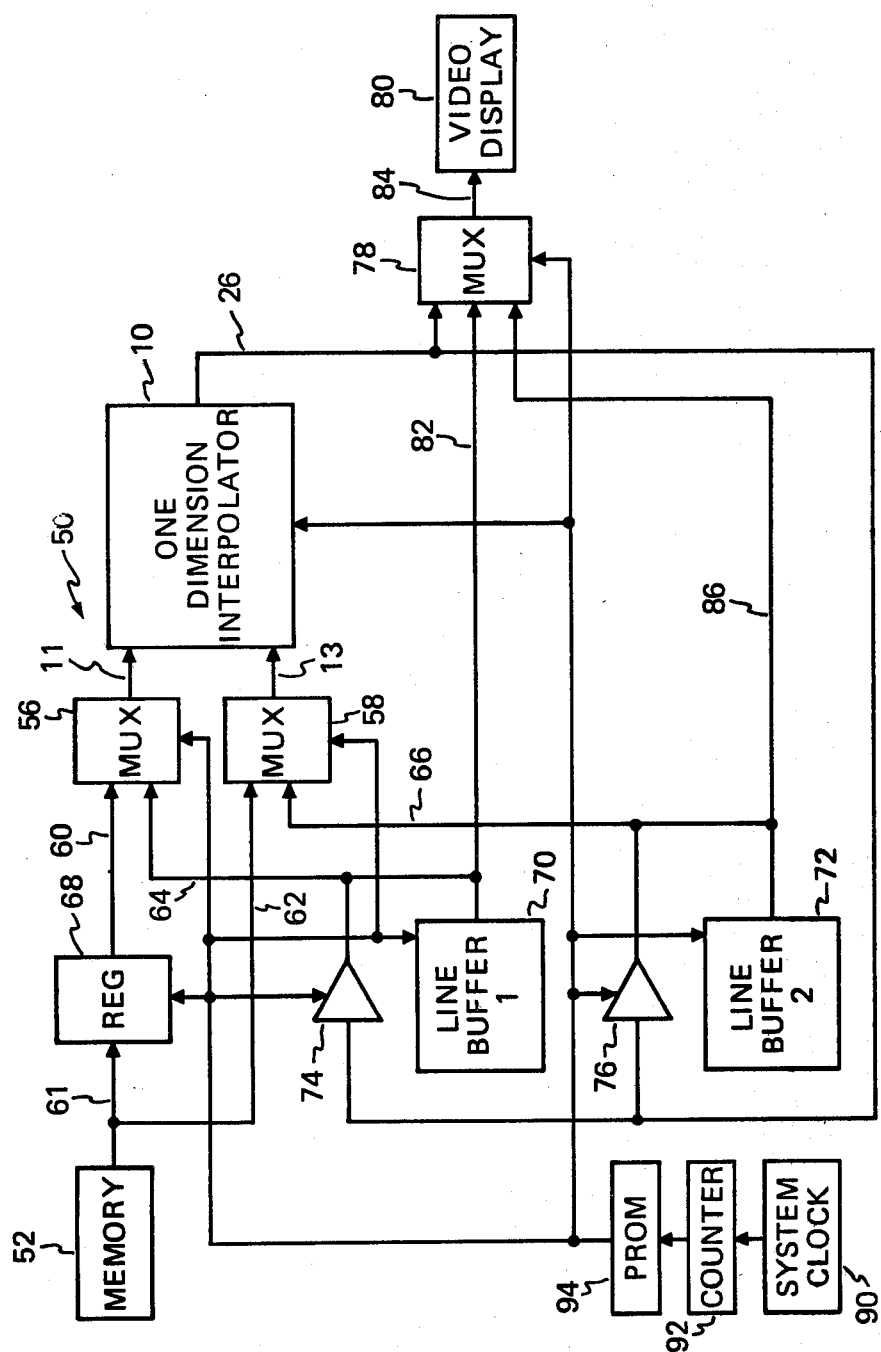
FIG. 4 is a schematic block diagram illustrating a two-dimensional interpolator of the present invention.

The one-dimensional interpolator is used as a building block to create a two-dimensional interpolator. A block diagram of the logic circuits comprising a two-dimensional interpolator 50 is shown in FIG. 4. The one-dimensional interpolator inputs 11 and 13 are obtained from a pair of multiplexers 56, 58, which are switched in unison so that both of the top inputs 60, 62 or both of the bottom inputs 64, 66 are selected together. The top inputs 60, 62 are used when inputting a new line of data from a memory unit 52. Input register 68 stores the second of two data points being interpolated and ouputs it to the interpolator 10 in conjunction with the data input 62 to provide the two data points necessary to the interpolation.

The control for the two-dimensional interpolator illustrated in FIG. 4 is obtained from counter 92, which provides the addresses for PROM 94 (Programmable Read Only Memory). The output of PROM 94 supplies the proper signals to strobe register 68, switch multiplexers 56, 58 and 78, enable gates 74 and 76, control the read or write modes of line buffers 70 and 72 and sequence the one-dimensional interpolator 10 through its states by controlling the outputs of multiplexers 14 and 18. The PROM is programmed to provide the control signals in the proper sequence to achieve the bilinear interpolation action. The counter is driven from the system clock 90 to insure synchronism with the other functions in the total video processing unit.

The operation of the interpolator proceeds as follows when the successive data points $P_1$ and $P_2$ are being interplated. Initially, the first point $P_1$ is clocked through the interpolator with no change and input at 61 to input register 68. It enters the one-dimensional interpolator 10 at the input 13 and is processed with the one-dimensional interpolator set in state 1 of Table 2.

points, 0.1, 0.2 and 0.3 with the interpolator stepping through states 2, 3 and 4 as shown on the line labelled "interpolator states" of Table 3. The input from the interpolator is a series of consecutive values for the respective data points as shown in the lines labelled Σ of Table 2. The data point numbers n0.1, etc., are the first interpolated data points between data points n and n+1. Data point numbers n0.2 and n0.3 are the second and third interpolated points, respectively.

TABLE 3

| CLOCK | n | n+1 | n+2 | n+3 | n+4 | n+5 | n+6 | n+7 | n+8 | n+9 | n+10 | ... |
|---|---|---|---|---|---|---|---|---|---|---|---|---|
| DATA POINT NUMBER AT INPUT b | 0 | 0 | 0 | 0 | 1 | 1 | 1 | 1 | 2 | 2 | 2 | ... |
| DATA POINT NUMBER AT INPUT a | — | — | — | — | 0 | 0 | 0 | 0 | 1 | 1 | 1 | ... |
| DATA POINT NUMBER AT OUTPUT | — | — | — | 0 | 0.1 | 0.2 | 0.3 | 1 | 1.1 | 1.2 | 1.3 | ... |
| INTERPOLATOR STATE | — | — | — | 1 | 2 | 3 | 4 | 1 | 2 | 3 | 4 | ... |

The second point $P_2$ is then put on the data input lines 61, 62. The first point $P_1$ is now input from input register 68 to a multiplexer 56 and via input 52 to the one-dimensional interpolator 10, and the second point $P_2$ is input through multiplexer 58 to interpolator 10 via input 13. The one-dimensional interpolator 10 is then stepped through states 2, 3 and 4 of Table 2. The output is clocked once for each state, producing three interpolated points between the first and second data pulses. The cycle then starts again with the second point being passed unchanged through the one-dimensional interpolator while in state 1.

The data sequence is shown in Table 3. Clock pulses starting at pulse n and being incremented at each clock interval are employed to time the sequence of steps for the interpolator. During the first four time periods, n through n+3, the b input is the 0 point pixel data from memory to input 13 of interpolator 16. No interpolation occurs, since only one data point is available to the interpolator. The data for the 0 point could be output at any of the time periods n through n+3. However, in order to provide a continuous data flow, output of the unaltered 0 point data is delayed until time n+3. At time n+4, the 0 point data becomes available as the input from the input register and the 1 point data becomes available at input b. Interpolation proceeds immediately to produce the interpolated data for the An entire line of an image is processed in this manner and the results are stored in a line buffer 70. The next line is then processed in the same manner and stored in line buffer 72. Alternate image lines interpolated in the x dimension will be stored one at a time in line buffer 70 and the other lines will be stored one at a time in line buffer 72 with the gates 74, 76 controlling input to buffers 70, 72, respectively.

The one-dimensionally interpolated data stored in the two line buffers 70, 72 are then used to calculate the interpolated lines, which are the result of interpolation in the Y dimension between corresponding points of the two stored lines. Only states 2, 3 and 4 of the one-dimensional interpolator (Table 2) are used for the Y direction interpolation or every fourth line in the sequence is obtained from one of the line buffers 70 or 72 to ensure outputting the lines in a continuous sequence via output multiplexer 78 to video display 80. The state of the one-dimensional interpolation is held constant throughout the generation of an entire interpolated line and changes only between lines. The data sequence for 4-to-1 interpolation in the y dimension is shown in Table 4.

TABLE 4

| OUTPUT LINE COUNT | INPUT DATA LINE NUMBER | LINE NUMBER STORED | BUFFER NUMBER WHERE LINE STORED | LINE NUMBER OUTPUTTED | ONE-DIMENSIONAL INTERPOLATOR STATE |
|---|---|---|---|---|---|
| Initialize | 0 | 0 | 1 | NONE | ALL |
| 0 | — | — | — | BLACK | IDLE |
| 1 | — | — | — | BLACK | IDLE |
| 2 | — | — | — | BLACK | IDLE |
| 3 | 1 | 1 | 2 | 0 | ALL |
| 4 | — | — | — | 0.1 | 2 |
| 5 | — | — | — | 0.2 | 3 |
| 6 | — | — | — | 0.3 | 4 |
| 7 | 2 | 2 | 1 | 1. | ALL |
| 8 | — | — | — | 1.1 | 4 |
| 9 | — | — | — | 1.2 | 3 |
| 10 | — | — | — | 1.3 | 2 |
| 11 | 3 | 3 | 2 | 2. | ALL |
| 12 | — | — | — | 2.1 | 2 |
| 13 | — | — | — | 2.2 | 3 |
| . | . | . | . | . | . |

Line n.1 in the column labelled "Line Number Outputted" is the first interpolated line between lines n and n+1. Line n.2 and n.3 are the second and third interpolated lines, respectively. In the last column on the right "ALL" indicates that the interpolator cycles through all four states while interpolating along a line to produce the x dimension interpolation. In the second column from the right "BLACK" indicates the output is held at the intensity value equivalent to black on the display. The black output line will produce a border along the edge of the display image, but this is a small effect which neither interferes with the number of the image nor causes any data handling complexity in the interpolation system.

Figure 5:
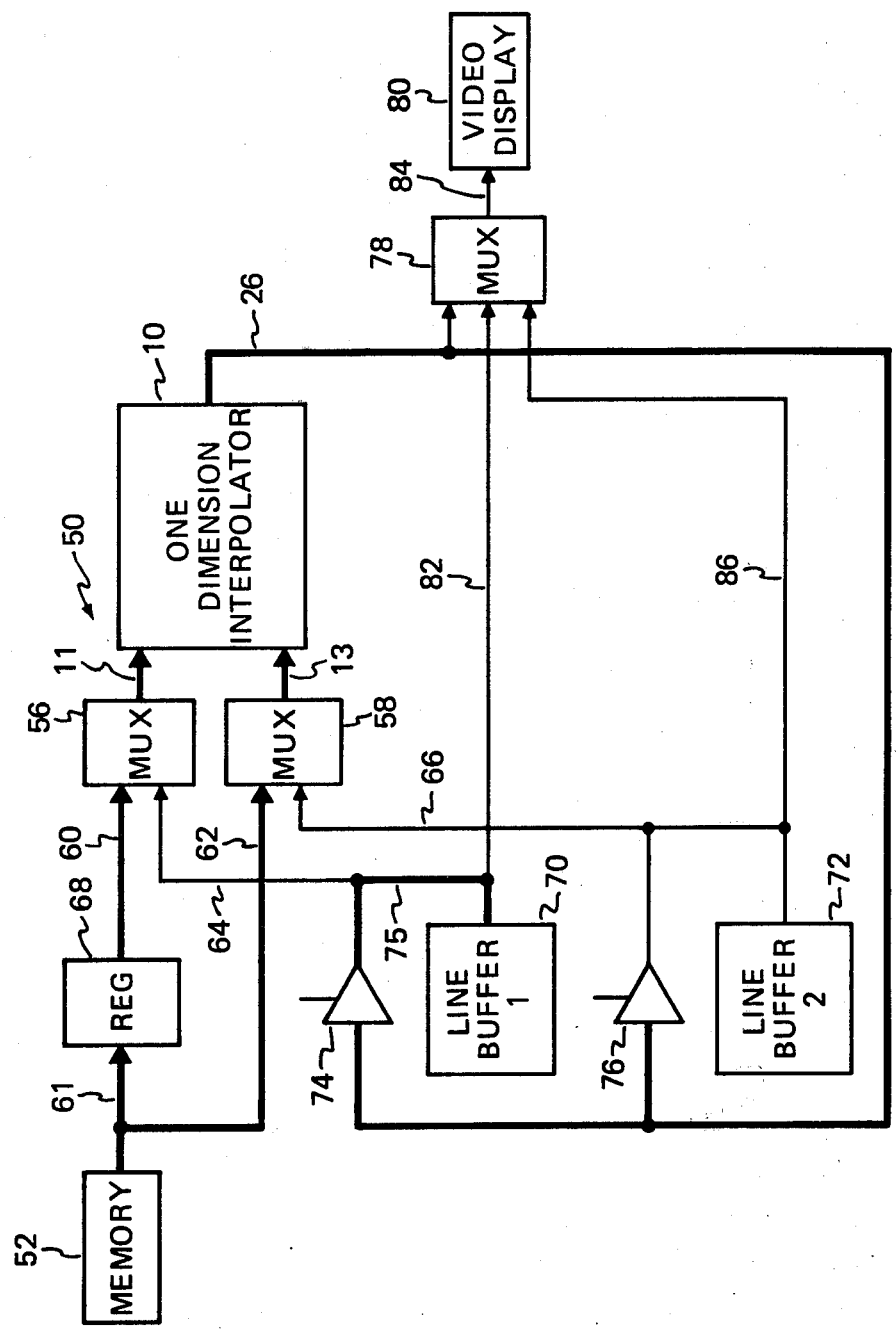
FIGS. 5–8 are block diagrams illustrating the data flow during distinct steps in the interpolation of the present invention.
Figure 6:
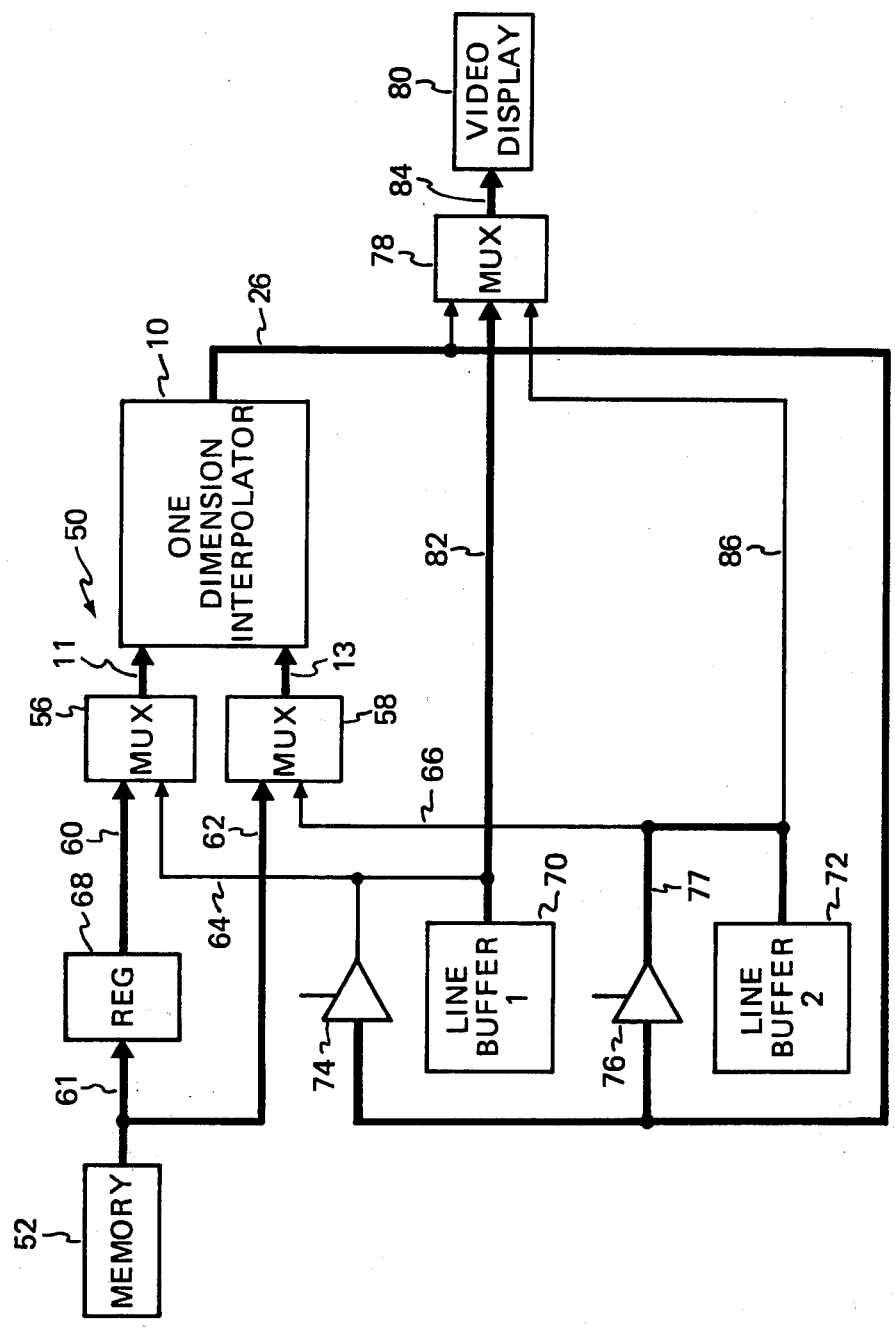

The operation of the complete interpolator is shown in the sequence of FIGS. 5 through 8. The bold lines indicate the active data paths during a particular step of the sequence, and the remaining lines indicate inactive data paths. FIG. 5 depicts the data paths used when interpolating and storing the first line (line 0) of an image. Input data is supplied from register 68 via input 60 to multiplexer 56 and via input 11 and from memory 52 via input 62 multiplexer 58 and input 13 to the one-dimensional interpolator 10 where interpolated data is calculated, which is written into line buffer 70 via gate 74 and input 75 as line a. The interpolator 10 then sits idle for time periods represented by n+1 and n+2 and n+3 in Table 3 waiting for line 1 to be input, since the Y interpolation process cannot begin until both lines 0 and 1 are stored. FIG. 6 shows the data flow as line 1 is inputted, interpolated in the X dimension in the same way as line 0 was handled, and the interpolated data stored in the buffer 72 via gate 76 and input 77. Simultaneously with interpolation of line 1, line 0 is read out of buffer 70 via input line 82 to output multiplexer 78 and line 84 to display 80 as shown in FIG. 6.

Figure 7:
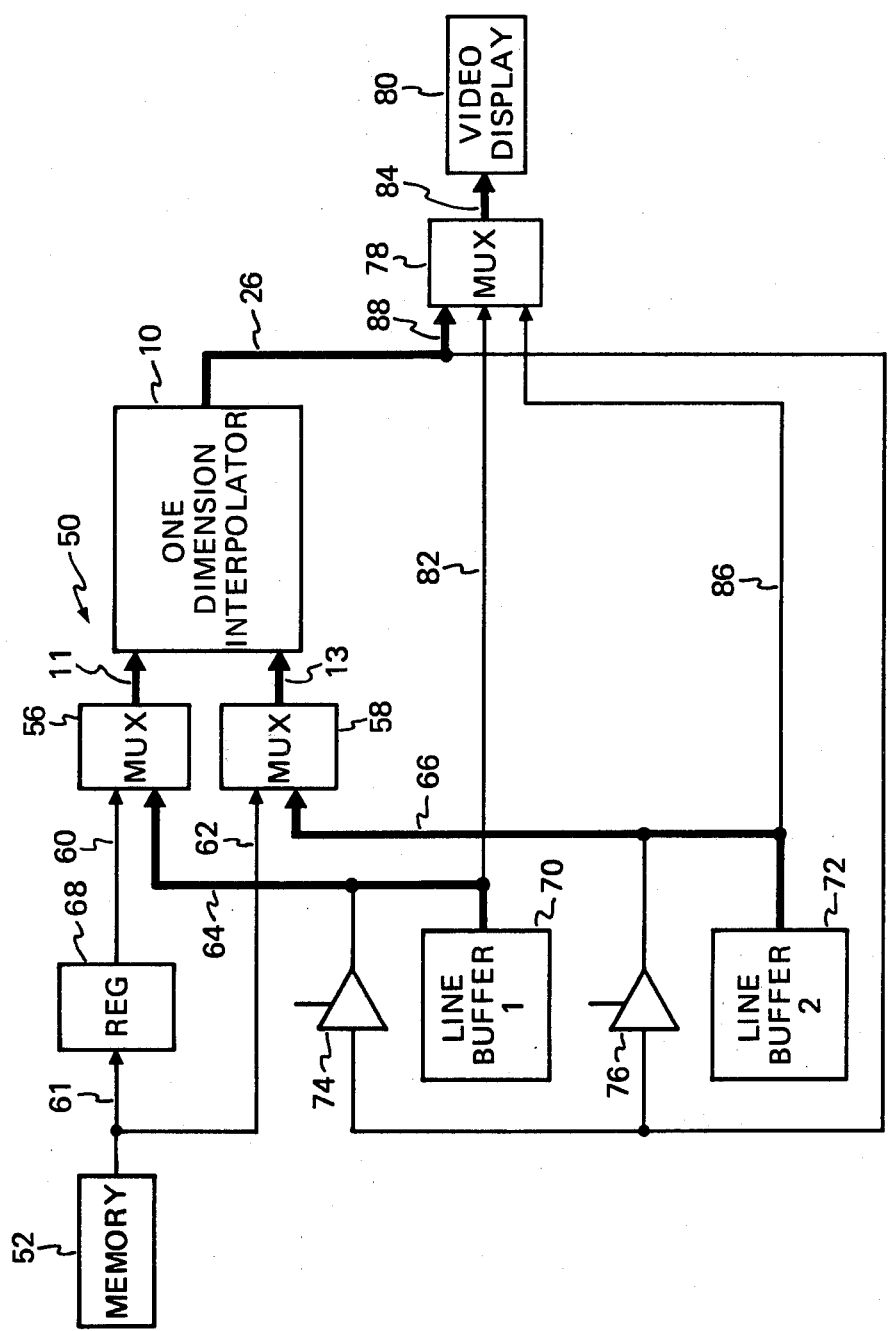
Figure 8:
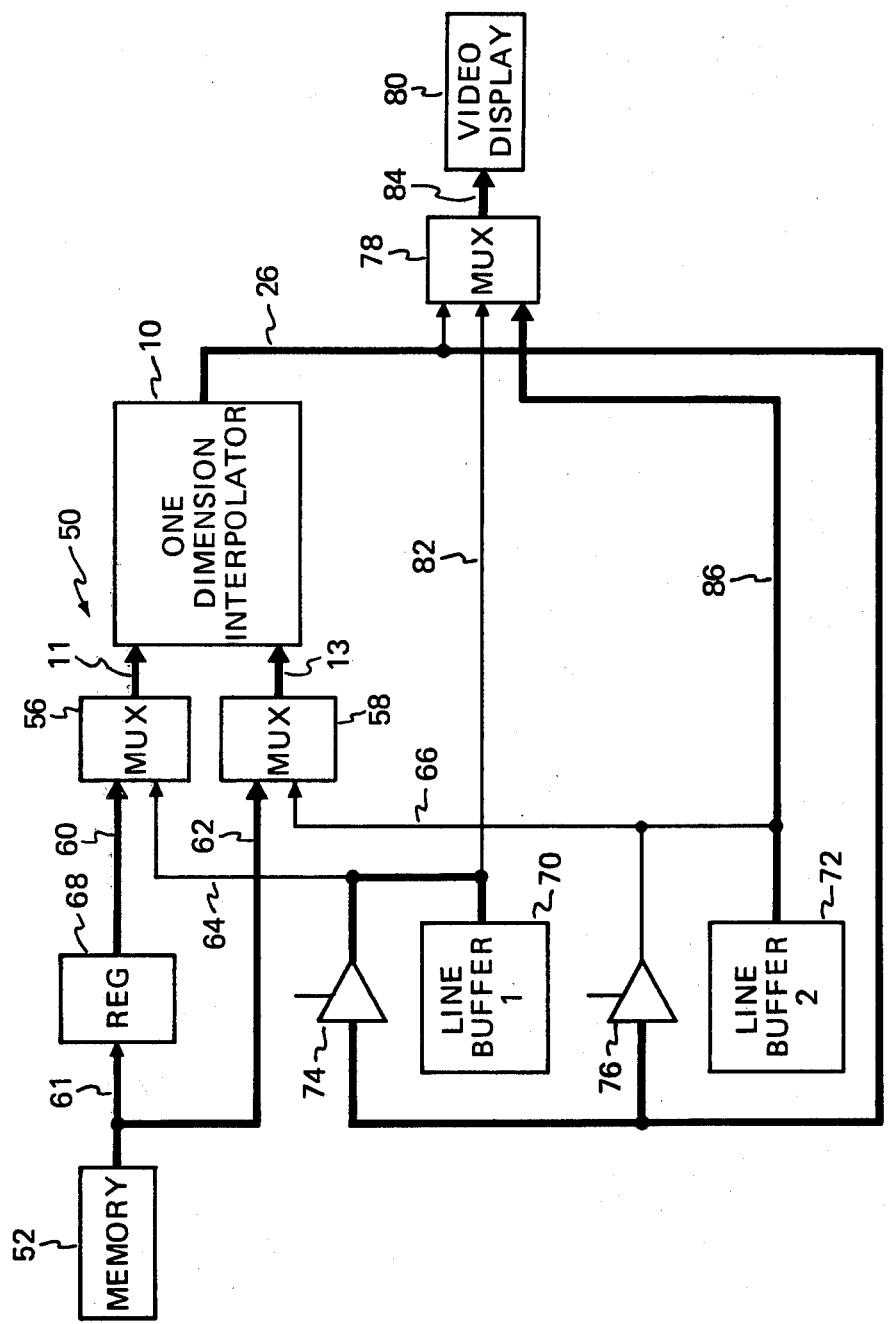

Now that both lines 0 and 1 are stored, the Y dimension interpolation can take place as shown in FIG. 7. Line 0 data was transmitted via input line 64 to multiplexer 56 and line 1 data are transmitted via input line 66 to multiplexer 58. Inputs 11 and 13 then provide data to interpolator 10. Notice that interpolated line 0.1 is output to output multiplexer 78 and display 80 immediately after line 0 is output with no gap in time between them. A gap is avoided by first writing line 0 into buffer 70 and not reading it out until line 1 was being written into buffer 72. The data paths shown in FIG. 7 are repeated for all three interpolation lines 0.1, 0.2 and 0.3. It is the changing of the one-dimensional interpolator mode that creates the appropriate values for the interpolated line being generated. After the three interpolated lines are outputted, the third line (line 2) is inputted, interpolated in the X dimension, and stored in buffer 70, while the second line (line 1) is outputted from buffer 72 via output line 86. The data paths for this step are shown in FIG. 8. FIG. 8 is similar to FIG. 6 except that the line buffer being written into and read out of are interchanged. As the data from successive interpolated lines is completed, storage of the data must be alternated between the two line buffers. The direction of the interpolation in the Y dimension will go first from line buffer 70 to line buffer 72. After reading in a subsequent line, it will then go from line buffer 72 to line buffer 70. This change in operation occurs, because incoming lines are alternately written in line buffer 70 and then line buffer 72, which in turn necessitates reversing the order in which the one-dimensional interpolator 10 sequences through its states. The states in the first cycle are ordered 2, 3 and 4, while in the second cycle they are ordered, 4, 3 and 2. This sequence keeps alternating between each new line that is inputted as shown in the right hand column of Table 4.

The image display pattern is shown in FIG. 9, along with the image display pattern of a direct data display. FIG. 9a shows the arrangement of pixels in a display system in which each pixel is stored in a memory location and separately read out when a display of the data is required. FIG. 9b shows the data pattern which results from a four-to-one interpolation according to the present invention. The top three rows and leftmost three pixels in each row of FIG. 9b are black, represented by the "b's," since no interpolated data can be produced until a second data input is received, and output of line 0 is delayed until line n+3, so that no gaps in output occur. The black border produced by this waiting causes no significant loss of image and enables the system to be implemented with a minimum of hardware. When providing real time images the interpolator must perform the complete interpolation of the entire image once during each scan time. The present invention allows this to be done with minimum hardware. Since only the stored data has to be inputted to the system, the amount of memory required is reduced. In the example described above the memory required is reduced from a 256×256 memory to a 64×64 memory, representing a reduction to one-sixteenth of the memory required for direct storage. Also for real time display, the present invention requires inputting of only one-sixteenth the data and can provide full scale display of successive images at the scan rate of the CRT display, so that the limit on real time display is the CRT scan rate rather than the data input equipment speed. The use of a single one-dimensional interpolator to achieve two-dimensional interpolation in real time results in a substantial reduction in hardware, and simultaneously reduces the time delay between data acquisition by an imaging device, such as a nuclear scanning imager and image display to such extent that successive images are displayed as they are produced. In the case of a nuclear scanning imager, the present invention allows immediate image evaluation, so that need for further images may be determined immediately, and, if needed, accomplished without requiring the patient to return at a separate time. Also, real time imaging allows evaluation of moving parts, such as a beating heart, thereby further facilitating accurate and immediate diagnosis of condition of the patient.

The data discussed above is described as intensity values. In the preferred embodiment the system employs 12 bit data to provide 12 bit variation in intensity data. The output data can be used to produce a color display by mapping the intensity data onto a color spectrum. Many variations of the data mapping may be employed to produce a particular desired display, e.g. false color can be used for contrast enhancement. The output from the two-dimensional interpolator of the present invention thus offers great flexibility in display system design, allowing the system designer to determine the optimum mapping of the data output by the interpolator system. Data in other than 12 bit format may be employed depending on the use to be made of the output data. Therefore, the present invention offers the speed necessary for real time image display with a minimum hardware requirement and at the same time offers great system flexibility.

What is claimed is:

1. A two-dimensional digital interpolation system comprising:

A. one-dimensional linear interpolator means for providing interpolated data values between pairs of input data values to generate primary interpolated scan lines for a video image; and B. means for providing selected output data values of said primary interpolated scan lines as input data to said one-dimensional linear interpolater means for interpolation in a dimension perpendicular to said primary interpolated scan lines to generate intermediate interpolated scan lines.

2. The invention of claim 1 further comprising:
A. means for inputting data to said one-dimensional interpolator means;
B. output means to selectively output data to a video display means; and
C. control means for supplying control signals to said one-dimensional interpolator means, said means for inputting data, said means for providing output data as input data to said one-dimensional interpolator means and said output means.

3. The invention of claim 2 wherein said means for providing selected output data values of said primary interpolated scan lines as input data comprises:
A. first and second line buffer means for storing output data values of alternate ones of said primary interpolated scan lines;
B. said first and second line buffer means supplying said primary scan line data for two primary scan lines simultaneously to said means for inputting data; and supplying said primary scan line data one line at a time to said output means.

4. The invention of claim 3 wherein said data input means comprises:
A. memory means for storing image data to be interpolated and sequentially outputting said stored image data to be input to said one-dimensional interpolator means;
B. input register means for temporarily storing input data received as input from said memory means and controllably supplying said data as an input for said one-dimensional interpolator;
C. first input multiplexer means for receiving as a first input said data output by said input primary scan line data from said first line buffer means;
D. second input multiplexer means for receiving as a first input said data output by said memory means, and receiving as a second input primary scan line data from said second line buffer means; and wherein
E. said control means includes means for controlling said first and second input multiplexer means to output simultaneously to said one-dimensional interpolator, said respective first inputs and to output simultaneously said respective second inputs.

5. The invention of claim 3 wherein said output means comprises:
A. an output multiplexer controlled by said control means to sequentially output interpolated primary line data from said first line buffer means, intermediate interplated line data from said one-dimensional interpolator means, and interpolated primary line data from said second line buffer means; and wherein said control means comprises:
(1) a system clock for supplying clock pulse;
(2) a counter for receiving said clock pulses and outputting a series of synchronizing signals; and
(3) a programmable read only memory programmed to provide control signals to said one-dimensional interpolator means, said means for inputting data, said means for providing selected output data values of said primary interpolated scan line and said output data.

6. The invention of claim 5 wherein said one-dimensional interpolator comprises:
A. third and fourth output multiplexer means for receiving said interpolator input signals and outputting selected ones of said input signals, said control means including means to control the respective outputs of said third and fourth input multiplexers to sequence said one-dimensional interpolator through a sequence of interpolator states to provide linear interpolation data between said input data values;
B. a first summer having as a first summer input the output from said fourth input multiplexer means and having as a second summer input said output from said second input multiplexer means and providing as a first summer output the sum of said first and second input signals; and
C. a second summer having as inputs the output from said third input multiplexer means and said first summer output and providing as a second summer output the sum of said third and fourth summer input signals.

7. A method for two-dimensional linear interpolation of a video image comprising the steps of:
(a) performing a linear interpolation of successive lines of video image data in a first dimension using a one-dimensional linear interpolator to produce successive linearly interpolated primary scan lines; and
(b) performing a linear interpolation between said successive interpolated primary scan lines in a second dimension perpendicular to said first dimension using the same said one-dimensional linear interpolator to produce intermediate scan lines for said video image.

8. The method of claim 7 wherein step (a) comprises the steps of:
(1) inputting line data for a first image line from a memory means in which image line data has been stored to said one-dimensional linear interpolator;
(2) linearly interpolating said line data for said first image line to provide a first interpolated primary scan line;
(3) electronically storing said first interpolated primary scan line;
(4) inputting line data for a second image line from said memory means to said one-dimensional linear interpolator;
(5) linearly interpolating said line data for said second image line to provide a second interpolated primary scan line; and
(6) electronically storing said second interpolated primary scan line.

9. The method of claim 8 wherein step (b) comprises the steps of:
(1) inputting said first and second interpolated primary scan line to said one-dimensional linear interpolator;
(2) linearly interpolating between corresponding data points of said first and second interpolated primary scan lines to provide intermediate interpolated scan lines.

10. The method of claim 9 further comprising the steps of:
(1) outputting said first interpolated primary scan line as a display input signal;

(2) outputting sequentially said intermediate interpolated scan lines as display input signals; and (3) outputting said second interpolated primary scan line as a display input signal.

11. The method of claim 10 further comprising:

(1) successively providing interpolated primary scan lines and interpolated intermediate scan lines;

(2) outputting an interpolated primary scan line to a video display simultaneous with the interpolation of the next successive primary scan line;

(3) outputting said intermediate scan lines immediately as they are outputted by said interpolator means; and (4) succssively repeating steps (2) and (3) of this claim until the complete video image has been interpolated and displayed.

* * * * *